United States Patent
Hsieh

(10) Patent No.: US 9,677,593 B2
(45) Date of Patent: Jun. 13, 2017

(54) BOLT TENSION GAUGING DEVICE

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 207 days.

(21) Appl. No.: 14/617,935

(22) Filed: Feb. 10, 2015

(65) Prior Publication Data

US 2015/0247520 A1 Sep. 3, 2015

(30) Foreign Application Priority Data

Mar. 3, 2014 (TW) ................ 103203598 U

(51) Int. Cl.
*F16B 31/02* (2006.01)
*G01L 5/24* (2006.01)

(52) U.S. Cl.
CPC ............. *F16B 31/02* (2013.01); *G01L 5/24* (2013.01)

(58) Field of Classification Search
CPC ...... F16B 1/0071; F16B 31/02; F16B 31/025; F16B 31/028; F16B 35/00; G01L 5/24; H04Q 2209/40; H04Q 2209/80
USPC .................................................. 411/8–9, 14
See application file for complete search history.

(56) References Cited

U.S. PATENT DOCUMENTS

| | | | | |
|---|---|---|---|---|
| 3,212,325 A | * | 10/1965 | Katz | G01L 1/2206 33/501.03 |
| RE30,183 E | * | 1/1980 | Popenoe | G01B 7/22 331/65 |
| 4,553,124 A | * | 11/1985 | Malicki | F16B 31/025 338/2 |
| 4,630,490 A | * | 12/1986 | Malicki | G01L 1/22 338/5 |
| 7,412,898 B1 | * | 8/2008 | Smith | G01L 5/24 73/761 |
| 7,441,462 B2 | * | 10/2008 | Kibblewhite | F16B 31/02 73/761 |
| 7,973,671 B2 | * | 7/2011 | Cloutier | F16B 31/021 116/200 |
| 8,024,980 B2 | * | 9/2011 | Arms | G01L 1/2225 73/761 |
| 8,521,448 B1 | * | 8/2013 | Ung | B64F 5/0045 702/42 |
| 2008/0253858 A1 | * | 10/2008 | Hsieh | F16B 31/02 411/14 |
| 2010/0054891 A1 | * | 3/2010 | Nishida | F16B 31/02 411/9 |
| 2015/0063941 A1 | * | 3/2015 | Hsieh | F16B 31/025 411/14 |

* cited by examiner

Primary Examiner — Roberta Delisle
(74) Attorney, Agent, or Firm — CKC & Partners Co., Ltd.

(57) ABSTRACT

A bolt tension gauging device is provided. The bolt tension gauging device includes a sensing bolt, a head and a displayer. The sensing bolt is for transmitting a stress signal. The head is for fitting with the sensing bolt. The displayer is connected to the head for displaying the stress signal.

10 Claims, 6 Drawing Sheets

BOLT TENSION GAUGING DEVICE

RELATED APPLICATIONS

The application claims priority to Taiwan Application Serial Number 103203598, filed on Mar. 3, 2014, which is herein incorporated by reference.

BACKGROUND

Technical Field

The present disclosure relates to a bolt (or screw). More particularly, the present disclosure relates to a bolt tension gauging device that being capable of sensing an instantaneous stress value. The bolt tension gauging device can be rapidly assembled and is convenient for use.

Description of Related Art

A bolt (or screw) is a widely used tool for securely screwing two objects together. Because public safety issues become more and more emphasized, selecting proper bolt is very important in the field of precision technology. Also, it is required to perform regular inspections on the stress applied to the bolt. For example, a bolt having precision stress is essential in the assembly of an air craft, a space ship, a bridge or a steel skeleton reinforced building. Even if the inspections on the stress of the bolt pass during the assembly, there is no guarantee on the safety of the bolt after the bolt suffers surrounding variations, such as metal aging, vibration or metal fatigue.

A kind of electrical torque wrench has been developed to address the aforementioned issues. In the electrical torque wrench, the stress is simultaneously sensed and measured in rotating the bolt. However, the operation for rotating the bolt consumes time and energy, so it is inconvenient for regular inspections. Further, when repeatedly rotating the bolt in the inspections, stress may be accumulated which damages the bolt or thread and deteriorates the structural strength of the assembly.

In view of this problem, another kind of stress sensing device has also been developed. In the stress sensing device, a sensor, an operator and a displayer are disposed in a bolt. However, the build-in sensor, operator and displayer significantly increase the manufacturing cost of a single bolt. Furthermore, the displayer is fixed such that the readout of the displayer for stress cannot be viewed in certain angles, which limits the performance of the displayer and the stress sensing device. Moreover, in case that multiple portions need to be sensed, a large amount of high-priced bolts is required. When the sensing device is applied in a specified environment (e.g. in an aircraft wing), its performance will also be limited concerning the requirements in surrounding resistance or weight.

SUMMARY

According to one aspect of the present disclosure, a bolt tension gauging device is provided. The bolt tension gauging device includes a sensing bolt, a head and a displayer. The sensing bolt is for sensing and transmitting a stress signal. The head is for fitting with the sensing bolt. The displayer is connected to the head for displaying the stress signal.

According to another aspect of the present disclosure, a bolt tension gauging, device is provided. The bolt tension gauging device includes a sensing bolt, a head, a wireless transceiver and a displayer. The sensing bolt is for sensing and transmitting a stress signal. The head is for fitting with the sensing bolt. The wireless transceiver is disposed on the head. The displayer is connected to the wireless transceiver for displaying the stress signal.

BRIEF DESCRIPTION OF THE DRAWINGS

The present disclosure can be more full understood by reading the following detailed description of the embodiment, with reference made to the accompanying drawings as follows:

FIG. 2 is dented;

FIG. 2 is protruded; and

DETAILED DESCRIPTION

Figure 1:
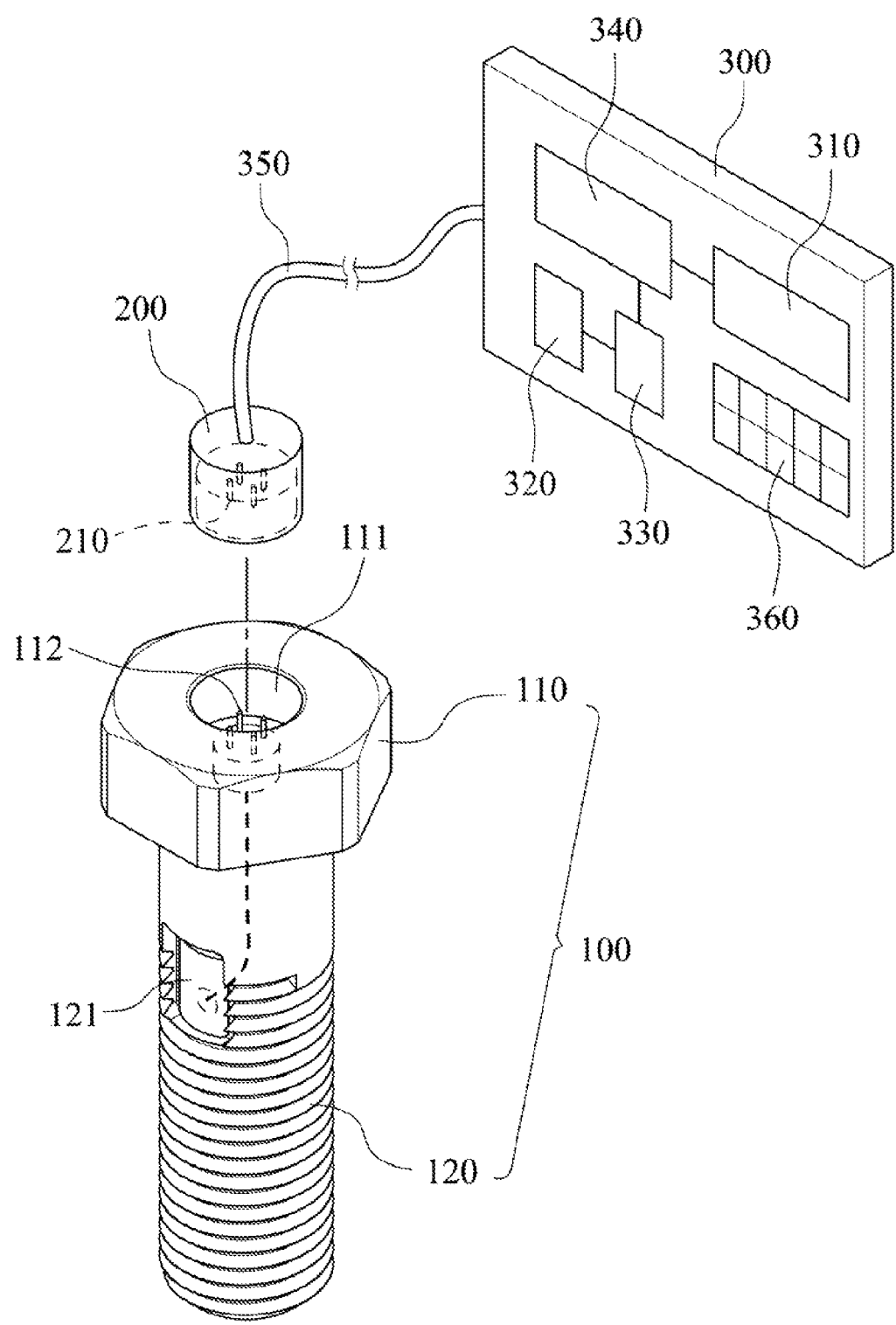
FIG. 1 is a perspective view showing a bolt tension gauging device according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a perspective view showing a bolt tension gauging device according to one embodiment of the present disclosure. The bolt tension gauging device includes a sensing bolt 100, a head 200 and a displayer 300.

The sensing bolt 100 includes a head portion 110 and a thread portion 120. A stress sensing member 121 is disposed on the thread portion 120 for sensing the stress applied to the thread portion 120 and transmits a stress signal. A base 111 is disposed on the head portion 110, and a plurality of first exposed leads 112 is disposed on the base 111.

The head 200 is connected to the displayer 300 by a connecting wire 350, and a plurality of second exposed leads 210 is disposed on the head 200. When the head 200 is fitted with the sensing bolt 100, the first exposed lead 112 on the base 111 is contacted with the second exposed lead 210 on the head 200, and the stress signal transmitted by the stress sensing member 121 can be transmitted to the displayer 300 by the connecting wire 350.

The displayer 300 includes a power supply 310, a signal transmitter 320, an analyzer 330, a displaying member 340 and a solar cell plate 360. The signal transmitter 320 transmits the stress signal to the analyzer 330. The analyzer 330 analyzes the stress signal and generates a stress value, and then the stress value is transmitted to the displaying member 340 by the analyzer 330. The stress value displayed on the displaying member 340 of the displayer 300 is an instantaneous stress value. The solar cell plate 360 generates an electric power by the sun-light, and provides the electric power to the power supply 310. The power supply 310 provides the electric power to the stress sensing member 121 on the sensing bolt 100 by the connecting wire 350.

Figure 2:
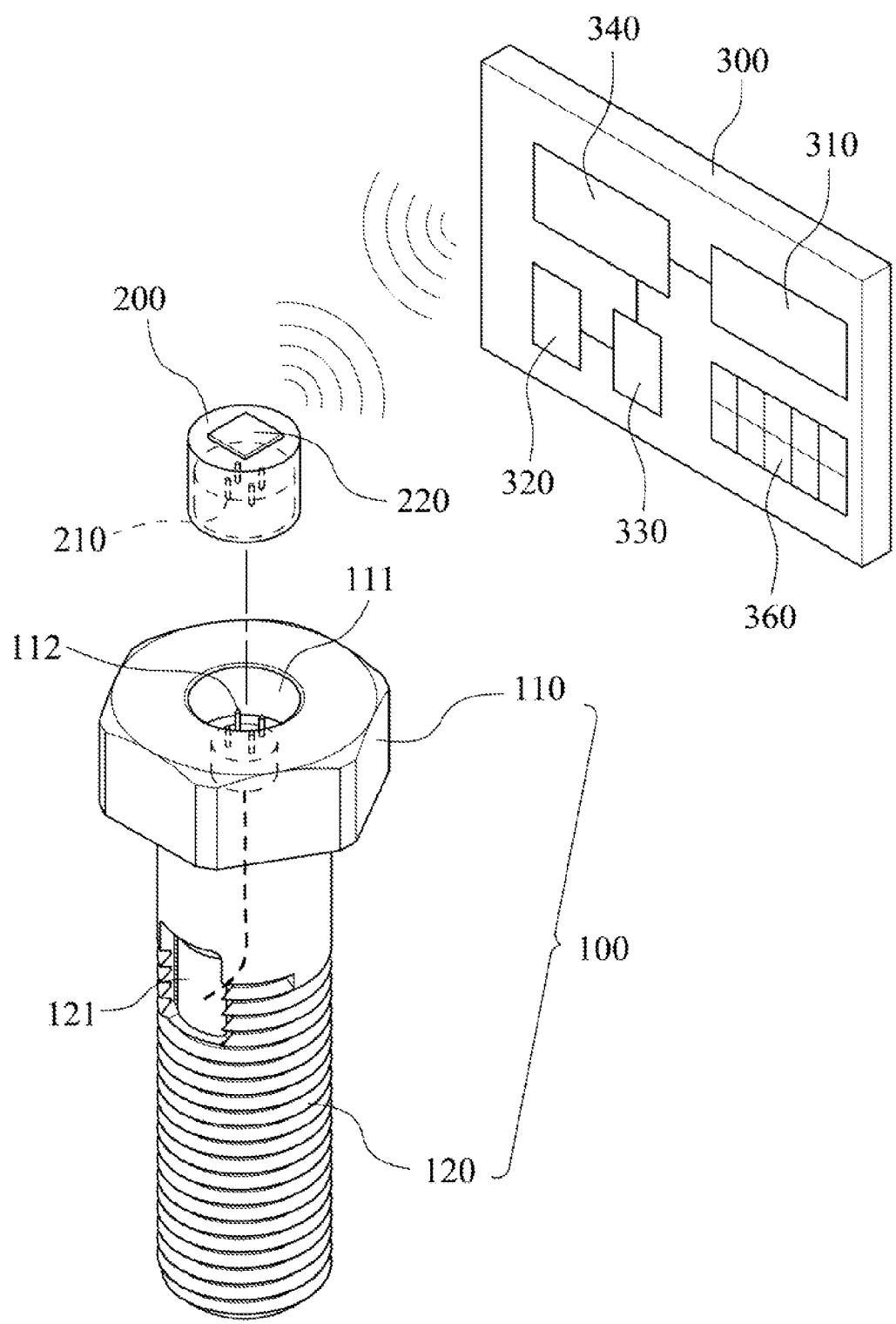
FIG. 2 is a perspective view showing a bolt tension gauging device according to another embodiment of the present disclosure.

FIG. 2 is a perspective view showing a bolt tension gauging device according to another embodiment of the present disclosure. In FIG. 2, the bolt tension gauging device includes a sensing bolt 100, a head 200, a wireless transceiver 220 and a displayer 300.

The sensing bolt 100 includes a head portion 110 and a thread portion 120. A stress sensing member 121 is disposed on the thread portion 120 for sensing the stress applied to the thread portion 120 and transmits a stress signal. A base 111 is disposed on the head portion 110, and a plurality of first exposed leads 112 is disposed on the base 111.

A plurality of second exposed leads 210 and the wireless transceiver 220 are disposed on the head 200. When the head 200 is fitted with the sensing bolt 100, the first exposed lead 112 on the base 111 is contacted with the second exposed lead 210 on the head 200 and the stress signal transmitted by the stress sensing member 121 can be transmitted to the displayer 300 by the wireless transceiver 220. The wireless transceiver 220 can be wirelessly connected to the displayer 300 through an infrared, a Bluetooth or a NFC.

The displayer 300 includes a power supply 310, a signal transmitter 320, an analyzer 330, a displaying member 340 and a solar cell plate 360. The signal transmitter 320 transmits the stress signal to the analyzer 330. The analyzer 330 analyzes the stress signal and generates a stress value, and then the stress value is transmitted to the displaying member 340 by the analyzer 330. The stress value displayed on the displaying member 340 of the displayer 300 is an instantaneous stress value. The solar cell plate 360 generates an electric power by the sun-light, and provides, the electric power to the power supply 310. The power supply 310 provides the electric power to the stress sensing member 121 on the sensing bolt 100 by the wireless transceiver 220.

Figure 3A:
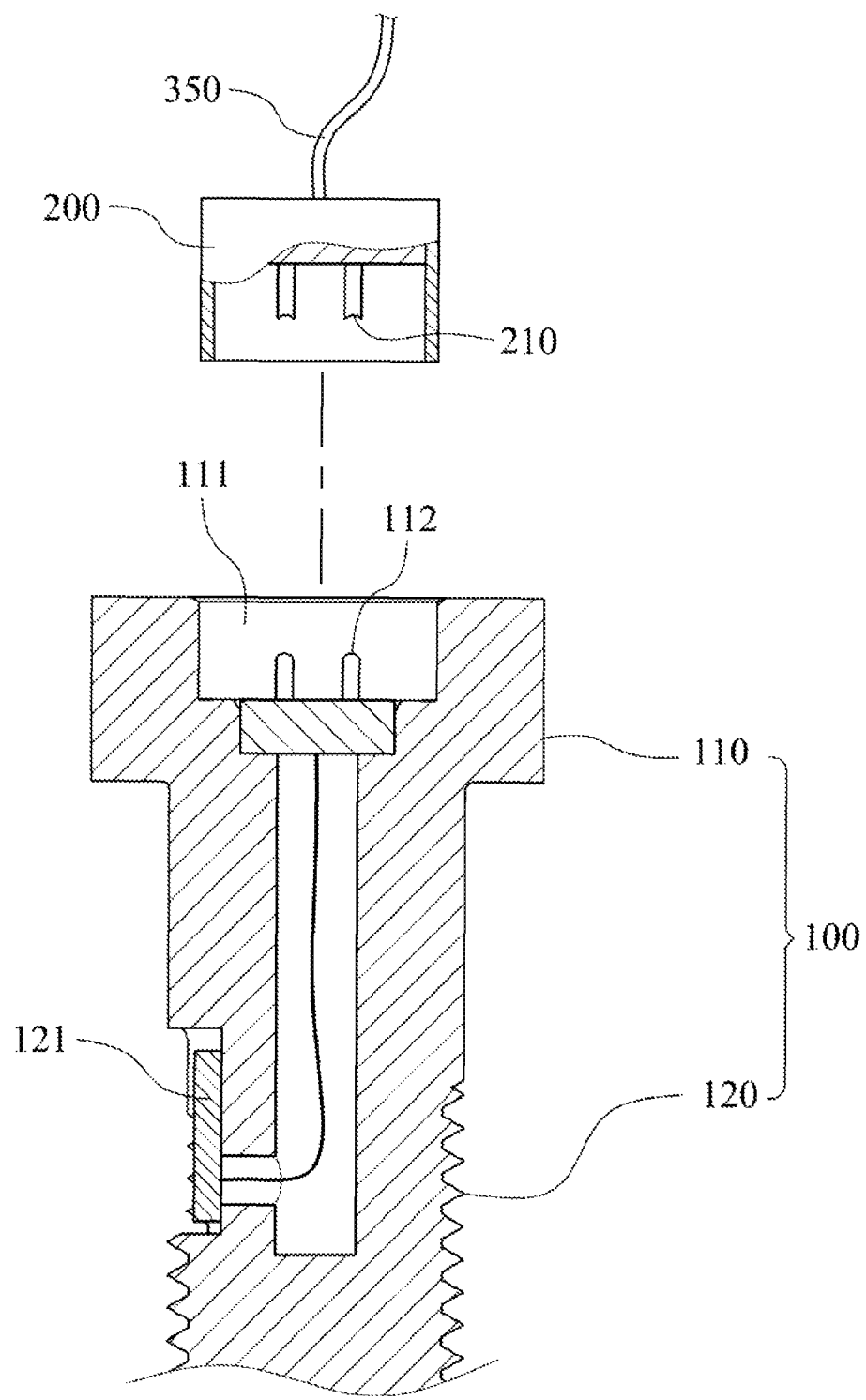
FIG. 3A shows that a base of FIG. 1

FIG. 3A shows that the base 111 of FIG. 1 or FIG. 2 is dented. The stress sensing member 121 is disposed on the thread portion 120. The dented base 111 is disposed on the head portion 110. A plurality of first exposed leads 112 is disposed on the dented base 111. The first exposed leads 112 are electrically connected to the stress sensing member 121. The stress sensing member 121 senses the stress applied to the thread portion 120.

Figure 3B:
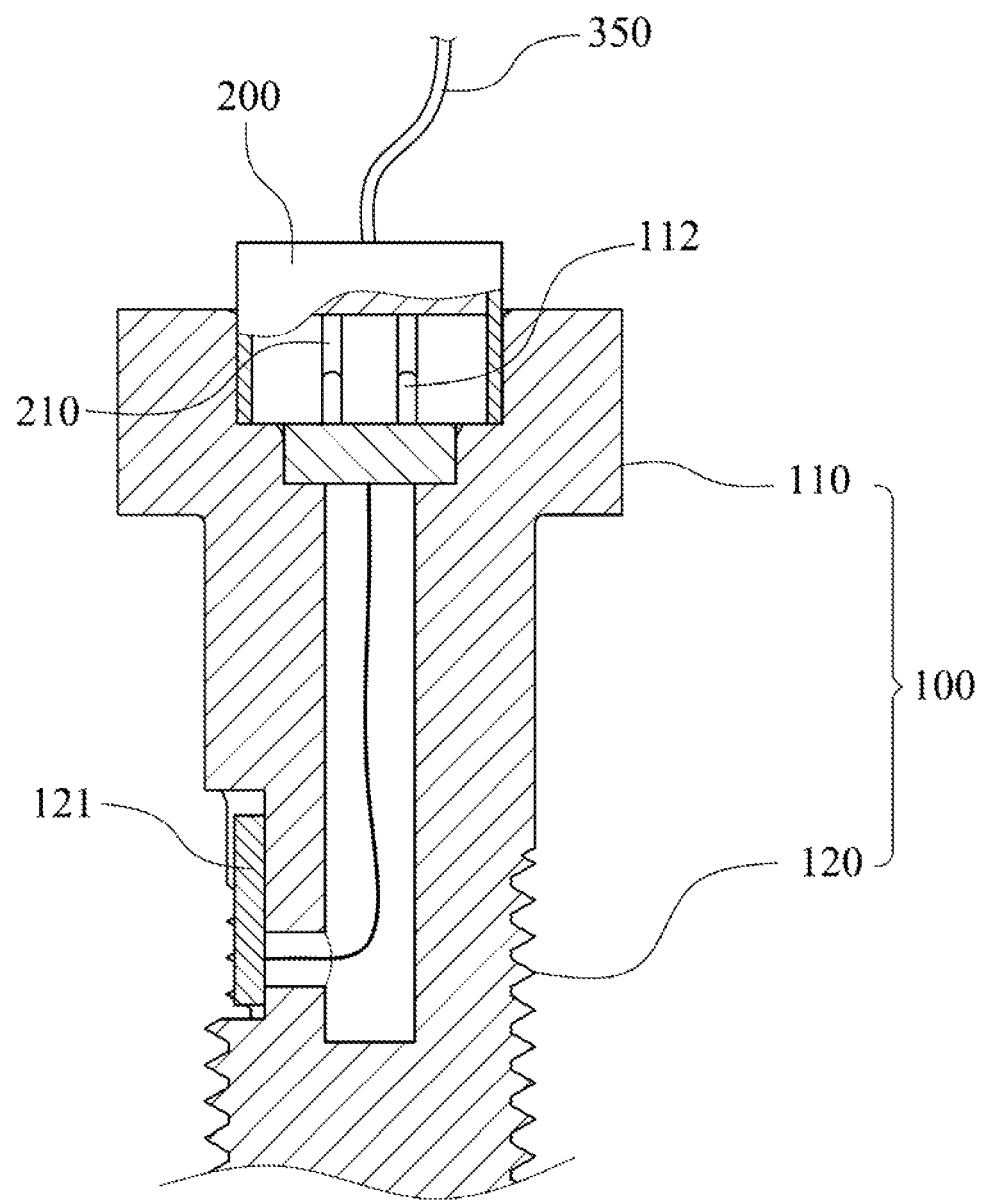
FIG. 3B shows that a head is connected with inside of the dented base of FIG. 3A.

FIG. 3B shows that the head 200 is connected with inside of the dented base 111 of FIG. 3A. When the head 200 is fitted with the sensing bolt 100, the first exposed lead 112 on the base 111 is contacted with the second exposed lead 210 on the head 200, and the stress signal sensed by the stress sensing member 121 can be transmitted to the displayer 300 in FIG. 1 by the connecting wire 350.

Figure 3C:
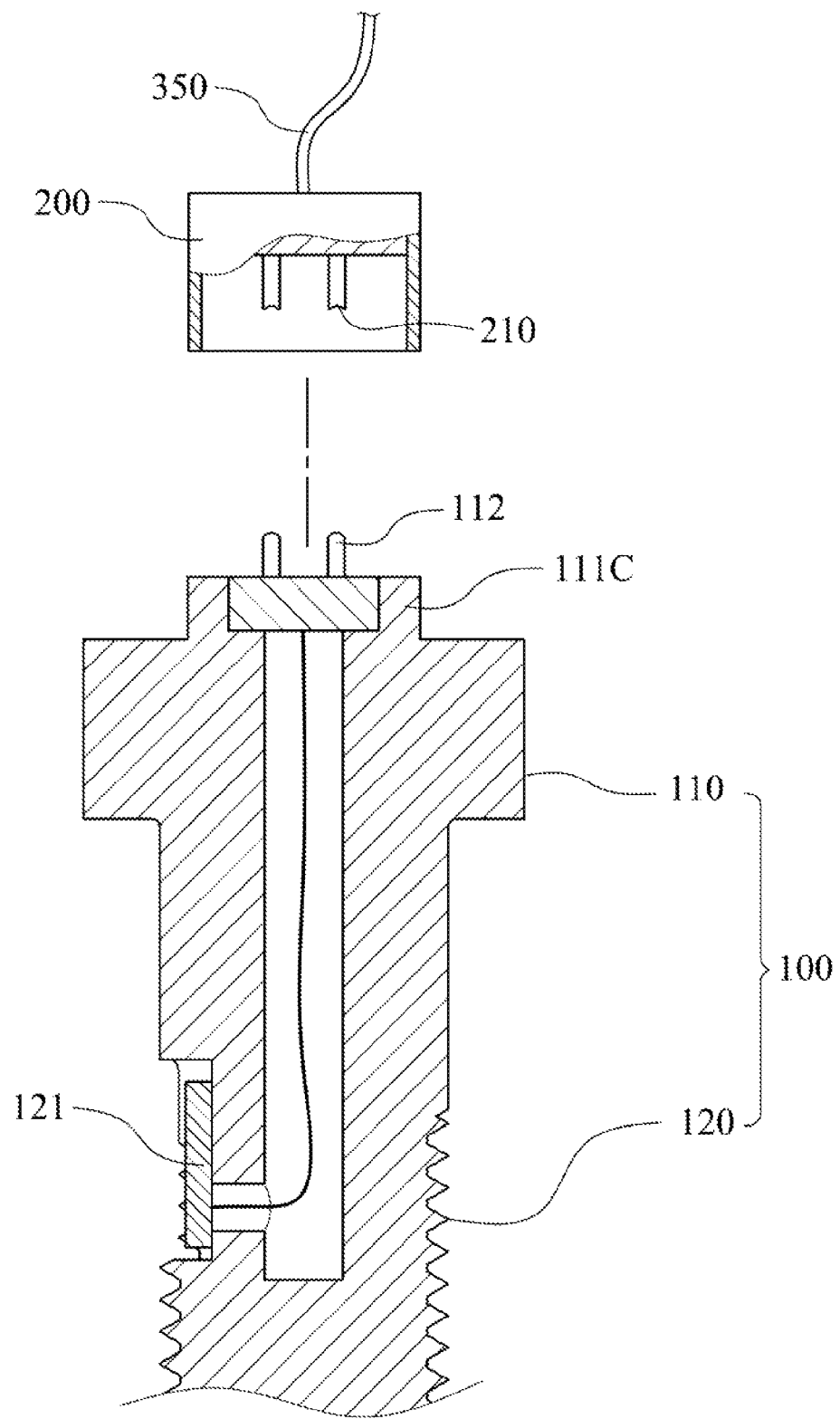
FIG. 3C shows that the base of FIG. 1

FIG. 3C shows that the base 111 of FIG. 1 or FIG. 2 is protruded, and a protruded base 111C is formed. The stress sensing member 121 is disposed on the thread portion 120. The protruded base 111C is disposed on the head portion 110. A plurality of first exposed leads 112 is disposed on the protruded base 111C. The first exposed leads 112 are electrically connected to the stress sensing member 121. The stress sensing member 121 senses the stress applied to the thread portion 120.

Figure 4:
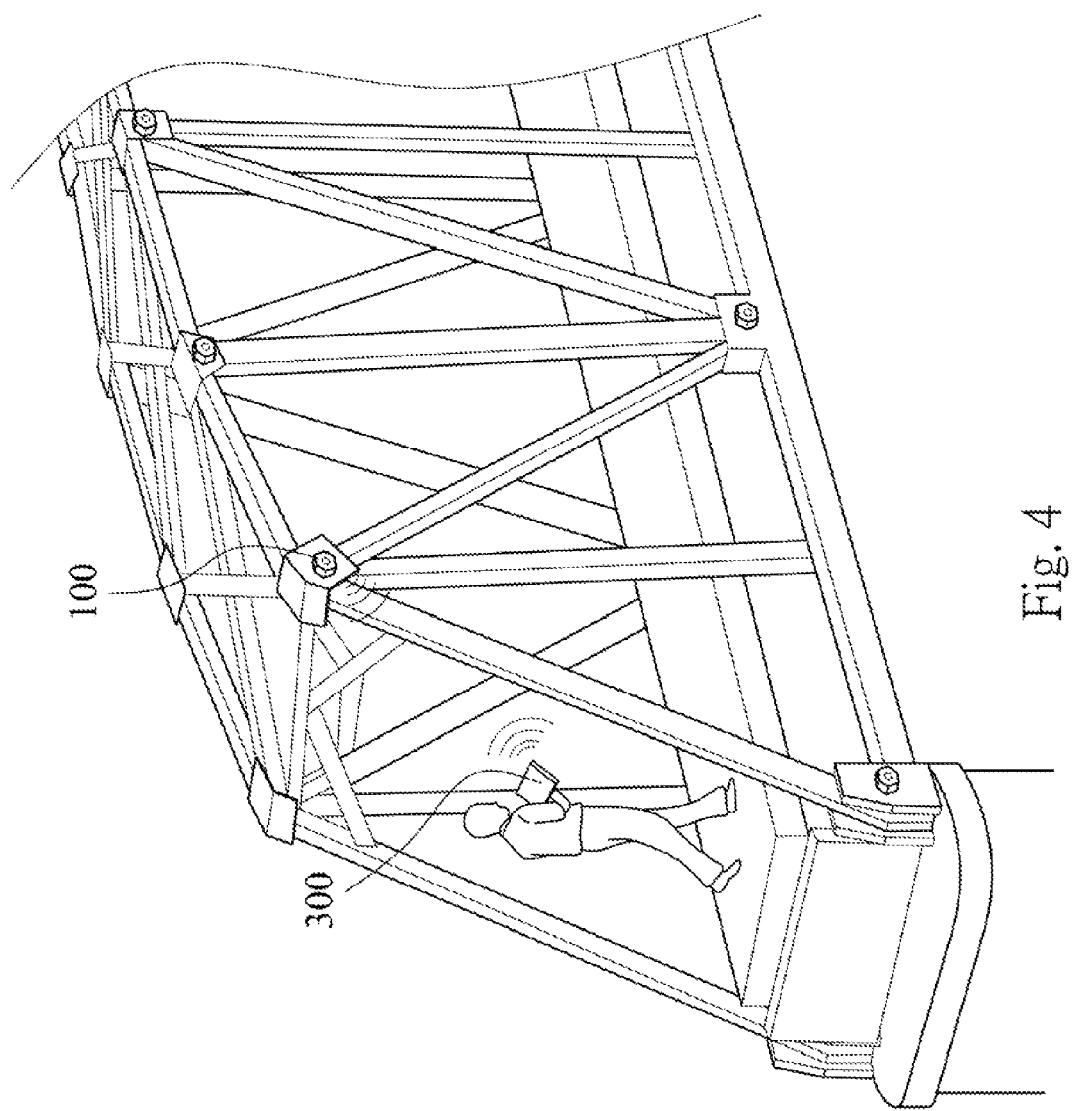
FIG. 4 is a schematic view showing an operation of the bolt tension gauging device of FIG. 2.

FIG. 4 is a schematic view showing an operation of the bolt tension gauging device of FIG. 2. In FIG. 4, the bolt tension gauging device is applied on a bridge. A head 200 can be fitted with the sensing bolt 100 located on a predetermined portion of the bridge. By the wireless transceiver 220, the sensed stress value of the predetermined portion can be wirelessly transmitted to the displayer 300, and an instantaneous stress value of the predetermined portion is showed on the displayer 300 immediately. In the aforementioned embodiment, one displayer 300 can be used with a plurality of heads 200. In detail, one displayer 300 can be applied for sensing stress values between a plurality of sensing bolts 100. When the head 200 is wirelessly connected to the displayer 300, the stress values of the sensing bolts 100 at some irregular angles or distances can also be sensed. Therefore, high convenience and high flexibility can be achieved, thereby simplifying the sensing process of a precision member.

In the characteristics that the tension (the tensile stress or the compressive stress) will cause a recalibration of the electron mobility or the hole mobility in the semiconductor structure, the aforementioned stress sensing member 121 is commonly a semiconductor structure such as an integrated circuit with MOSFET. The material of the MOSFET can be GRAPHENE, thus the characteristic can be enhanced. The shape of the aforementioned stress sensing member 121 can be a piece or a ring, and the stress sensing member 121 can be disposed on the thread portion 120.

An axial direction and a radial direction of the head 200 can be limited by the base 111 or the base 111C, thus the head 200 can be fitted therewith and can be positioned.

It should be mentioned that in the bolt tension gauging device of the present disclosure, the term "bolt" can also be referred as a screw or the like, which is not limited herein.

In sum up, the bolt tension gauging device of the present disclosure has advantages on rapid assembling and disassembling, high positioning capability and low cost. Furthermore, through the wireless connection between the displayer 300 and the head 200, high convenience and high flexibility can be achieved, thereby simplifying the sensing process of a precision member.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A bolt tension gauging device, comprising:
   a sensing bolt having a head portion and a thread portion, the thread portion has a recess on a peripheral surface, and a stress sensing member is configured to fit onto the recess for sensing a stress applied to the thread portion and transmitting a stress signal;
   a head for detachably fitting with the sensing bolt;
   a wireless transceiver disposed on the head and transmitting the stress signal received from the sensing bolt; and
   a displayer wirelessly connected to the wireless transceiver for displaying the stress signal received from the wireless transceiver.

2. The bolt tension gauging device of claim 1, wherein the sensing bolt comprises a base for fitting with the head.

3. The bolt tension gauging device of claim 2, wherein the base is protruded or dented.

4. The bolt tension gauging device of claim 3, wherein at least one first exposed lead is disposed on the base, at least one second exposed lead is disposed on the head, and the first exposed lead is connected with the second exposed lead for transmitting the stress signal.

5. The bolt tension gauging device of claim 1, wherein the wireless transceiver is connected through an Infrared, a Bluetooth or a NFC.

6. A bolt tension gauging device, comprising:
   a sensing bolt having a head portion and a thread portion, the thread portion has a recess on a peripheral surface, and a stress sensing member is configured to fit onto the recess for sensing a stress applied to the thread portion and transmitting a stress signal;

a head for detachably fitting with the sensing bolt; and a displayer connected to the head for displaying the stress signal.

7. The bolt tension gauging device of claim 6, wherein the sensing bolt comprises a base for fitting with the head.

8. The bolt tension gauging device of claim 7, wherein the base is protruded or dented.

9. The bolt tension gauging device of claim 7, wherein in at least one first exposed lead is disposed on the base, at least one second exposed lead is disposed on the head, and the first exposed lead is connected with the second exposed lead for transmitting the stress signal.

10. The bolt tension gauging device of claim 6, wherein the displayer further comprises a solar cell plate.

\* \* \* \* \*